(12) United States Patent
Ito

(10) Patent No.: US 6,474,622 B2
(45) Date of Patent: Nov. 5, 2002

(54) GATE VALVE

(75) Inventor: Ichio Ito, Tokyo (JP)

(73) Assignee: V Tex Corporation, Tokyo (JP)

( * ) Notice: Subject to any disclaimer, the term of this patent is extended or adjusted under 35 U.S.C. 154(b) by 0 days.

(21) Appl. No.: 10/003,667

(22) Filed: Oct. 22, 2001

(65) Prior Publication Data

US 2002/0139954 A1 Oct. 3, 2002

(30) Foreign Application Priority Data

Mar. 28, 2001 (JP) ........................................ 2001-093506

(51) Int. Cl.⁷ ................................................. F16K 3/18
(52) U.S. Cl. ........................ 251/158; 251/204; 251/251
(58) Field of Search ................................ 251/326, 204, 251/203, 193, 158, 251, 228

(56) References Cited

U.S. PATENT DOCUMENTS

| | | | | | |
|---|---|---|---|---|---|
| 3,120,944 A | * | 2/1964 | Cogez et al. | ................ | 251/158 |
| 3,237,916 A | * | 3/1966 | Bryant | ................ | 251/204 |
| 3,343,562 A | * | 9/1967 | Combes | ................ | 251/158 |
| 3,973,753 A | * | 8/1976 | Wheeler et al. | ............ | 251/204 |
| 4,089,505 A | * | 5/1978 | Anderle et al. | ............. | 251/158 |
| 4,470,576 A | * | 9/1984 | Schertler | ................ | 251/158 |
| 4,560,141 A | * | 12/1985 | Bosch | ................ | 251/204 |
| 6,089,537 A | | 7/2000 | Olmsted | | |
| 6,161,576 A | * | 12/2000 | Maher et al. | .......... | 137/565.23 |

FOREIGN PATENT DOCUMENTS

JP 03277876 A 12/1991

* cited by examiner

Primary Examiner—Lesley D. Morris
Assistant Examiner—John Bastianelli
(74) Attorney, Agent, or Firm—Boyle Fredrickson Newholm Stein & Gratz S.C.

(57) ABSTRACT

A pendulum gate valve incorporates an improved power transmission device for transmitting the movement of a pivot arm of the valve to a valve disk that selectively closes the valve. The power transmission device has a supporting plate and a valve disk support that is fixed to a tip end of the pivot arm and movable relative to the valve disk. First and second facing roller guide grooves, formed on the valve disk and on the valve disk support, respectively, extend obliquely downwardly so as to be separated from the valve disk. Third and fourth facing roller guide grooves, formed on the valve disk support and the supporting plate, respectively, extend obliquely downwardly so as to approach the valve disk. A first roller engages the first and second roller guide grooves, and a second roller engages the third and fourth roller guide grooves.

19 Claims, 13 Drawing Sheets

GATE VALVE

BACKGROUND OF THE INVENTION

1. Field of the Invention

The present invention relates to a gate valve and, more particularly, relates to a pendulum gate valve for use in a processing device for processing a semiconductor wafer or the like.

2. Description of the Prior Art

In a processing device for processing a semiconductor wafer, a liquid crystal substrate or the like, the wafer or the substrate is inserted into or taken out from one of many kinds of processing rooms through passages each having a gate valve, for example, a pendulum gate valve. It is necessary to prevent as much as possible foreign matters from entering into the processing room.

Such gate valve is described in the U.S. Pat. No. 6,089,537. In such gate valve, a valve disc is moved up and down while separating from a valve seat, and the valve disc is brought into contact with the valve seat by urging the side surface of the valve disc toward the valve seat when the valve disc is positioned to face to the valve seat.

FIG. 17 and FIG. 18 show the conventional pendulum gate valve having a hollow box-like valve housing 1 in the shape of oval in cross section, defining an interior space. The valve housing 1 includes a pair of opposing circular openings 2 and 3 through which an article to be processed and/or processing gas pass into a process chamber when the gate valve is opened.

The gate valve includes a valve disk 5. When the gate valve is closed, the valve disk 5 comes into contact with a valve seat 4 provided in the interior space around the edge of the opening 2. The valve disk 5 is held by a pivot arm 6 and moved by an arm driving device 8 centering around a pivotal point 7 formed on the valve housing 1 between a completely opened position and a completely closed position.

In the above conventional pendulum gate valve, the valve disk 5 in the completely closed position is urged toward the valve seat 4 through the tip end of the arm 6 by the arm driving device 8. Accordingly, it is necessary to use the arm driving device 8 large in power and size, and the arm 6 large in diameter.

Other conventional gate valve is disclosed in the Japanese Patent Laid-Open No. 277,876/91. In this gate valve, a valve plate is provided facing the valve disk, and a pressure fluid is introduced into a space between the valve plate and the valve disk to separate with each other, so that the valve disk is urged to the valve seat by utilizing the reaction force to the force applied to the valve plate.

In this gate valve, however, a device for introducing the pressure fluid into the space must be provided, so that the gate valve becomes large in size.

SUMMARY OF THE INVENTION

Accordingly, it is an object of this invention to provide a pendulum gate valve free from the above defects.

The invention can be summarized as follows.

A pendulum gate valve of the present invention comprises a valve housing including an interior space and first and second openings opposite to each other;

a valve seat disposed in the interior space around the edge of the first opening;

a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;

a pivot arm, the base end of which is pivotally secured to the valve housing;

an arm driving device for moving a tip end of the pivot arm between a first position where the valve disk is in the completely opened position and a second position where the valve disk is in the completely closed position; and a power transmission device for transmitting the movement of the pivot arm to the valve disk;

the power transmission device having a first roller guide groove formed on the valve disk, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, each of the first and second roller guide grooves extending downwards obliquely so as to be separated from the valve disk, and each of the third and fourth roller guide grooves extending downwards obliquely so as to approach to the valve disk.

A pendulum gate valve of the present invention comprises a valve housing including an interior space and first and second openings opposite to each other;

a valve seat disposed in the interior space around the edge of the first opening;

a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;

a pivot arm, the base end of which is pivotally secured to the valve housing;

an arm driving device for moving a tip end of the pivot arm between a first position where the valve disk is in the completely opened position and a second position where the valve disk is in the completely closed position; and a power transmission device for transmitting the movement of the pivot arm to the valve disk;

the power transmission device having a first roller guide groove formed on the valve disk, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, the first roller guide groove extending downwards obliquely so as to be separated from the valve disk and then extending downwards substantially vertically, the second roller guide groove extending upwards obliquely so as to approach to the valve disk and then extending upwards substantially vertically, the third roller guide groove extending downwards obliquely so as to approach to the valve disk and then extended downwards substantially vertically, and the fourth roller guide groove extending upwards obliquely so as to be separated from the valve disk and then extended upwards substantially vertically.

A pendulum gate valve of the present invention comprises a valve housing including an interior space and first and second openings opposite to each other;

a valve seat disposed in the interior space around the edge of the first opening;

a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;

a pivot arm, the base end of which is pivotally secured to the valve housing;

an arm driving device for moving a tip end of the pivot arm between a first position where the valve disk is in the completely opened position and a second position where the valve disk is in the completely closed position; and a power transmission device for transmitting the movement of the pivot arm to the valve disk;

the power transmission device having a pair of holders facing each other with a space therebetween, mounted on a back surface of the valve disk opposite to the valve seat, a first roller guide groove formed on each of opposite surfaces of the holders, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, each of the first and second roller guide grooves extending downwards obliquely so as to be separated from the valve disk, and each of the third and fourth roller guide grooves extending downwards obliquely so as to approach to the valve disk.

A pendulum gate valve of the present invention comprises a valve housing including an interior space and first and second openings opposite to each other;

a valve seat disposed in the interior space around the edge of the first opening;

a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;

a pivot arm, the base end of which is pivotally secured to the valve housing;

an arm driving device for moving a tip end of the pivot arm between a first position where the valve disk is in the completely opened position and a second position where the valve disk is in the completely closed position; and a power transmission device for transmitting the movement of the pivot arm to the valve disk;

the power transmission device having a pair of holders facing each other with a space therebetween, mounted on a back surface of the valve disk opposite to the valve seat, a first roller guide groove formed on each of opposite surfaces of the holders, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, the first roller guide groove extending downwards obliquely so as to be separated from the valve disk and then extending downwards substantially vertically, the second roller guide groove extending downwards obliquely so as to approach to the valve disk and then extending downwards substantially vertically, the third roller guide groove extending downwards obliquely so as to approach to the valve disk and then extended downwards substantially vertically, and the fourth roller guide groove extending upwards obliquely so as to be separated from the valve disk and then extended upwards substantially vertically.

The pendulum gate valve has a member for preventing the supporting plate from moving relative to the valve disk in the moving direction of the pivot arm.

The pendulum gate valve has a member for preventing resiliently the supporting plate from moving relative to the valve disk in the moving direction of the pivot arm.

The pendulum gate valve has a member for preventing resiliently the valve disk from moving relative to the valve disk support in the moving direction of the pivot arm.

The pendulum gate valve has a member for preventing resiliently the valve disk from moving relative to the valve disk support in the moving direction of the pivot arm.

The pendulum gate valve has a stopper projected downwards from the lower end of the valve disk.

Other objects and advantages will become apparent from the following description of the preferred embodiments taken in conjunction with the accompanying drawings.

DESCRIPTION OF THE PREFERRED EMBODIMENTS

Figure 1:
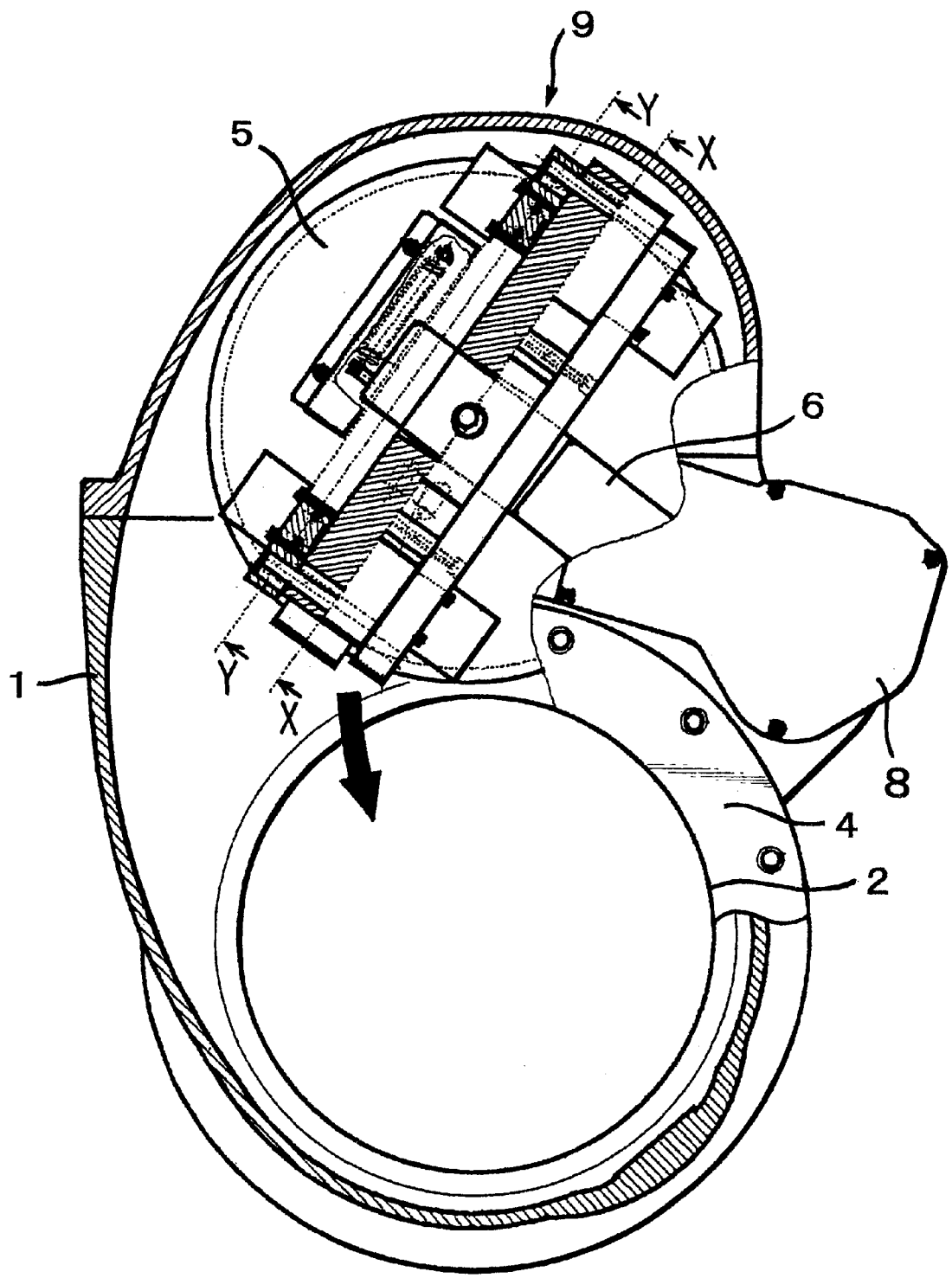
FIG. 1 is a vertically sectioned front view of a pendulum gate valve in accordance with the present invention in a state before the gate valve is closed.
Figure 2:
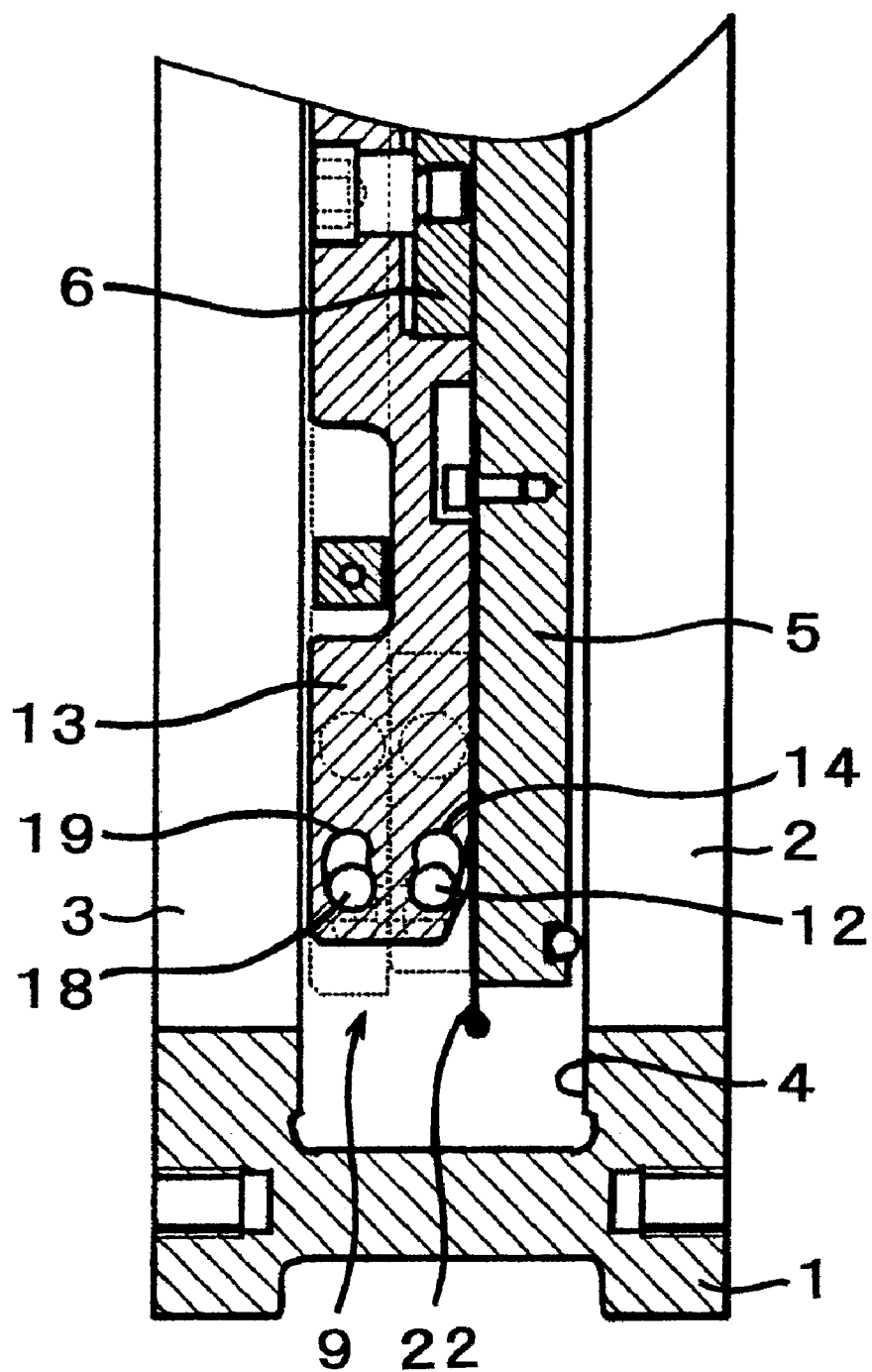
FIG. 2 is a cross sectional view taken along line X—X of FIG. 1.
Figure 3:
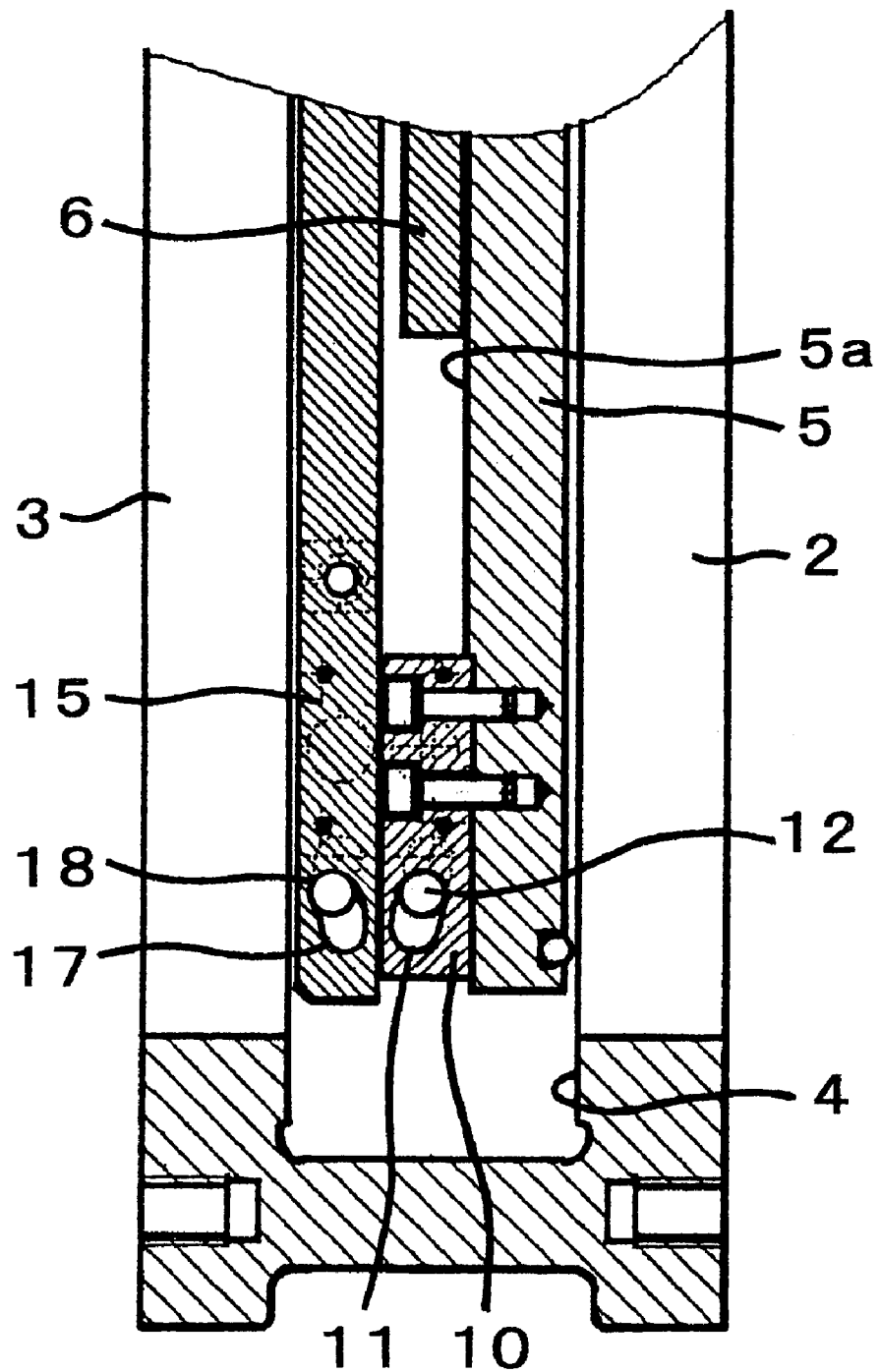
FIG. 3 is a cross sectional view taken along line Y—Y of FIG. 1.
Figure 4:
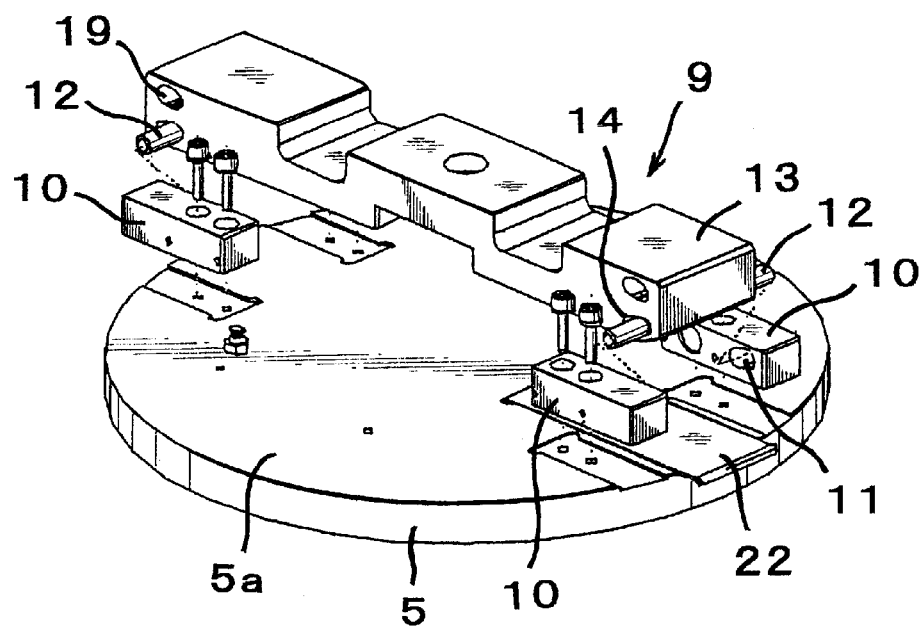
FIG. 4 is a perspective view of a power transmission device of the pendulum gate valve in accordance with the present invention.
Figure 5:
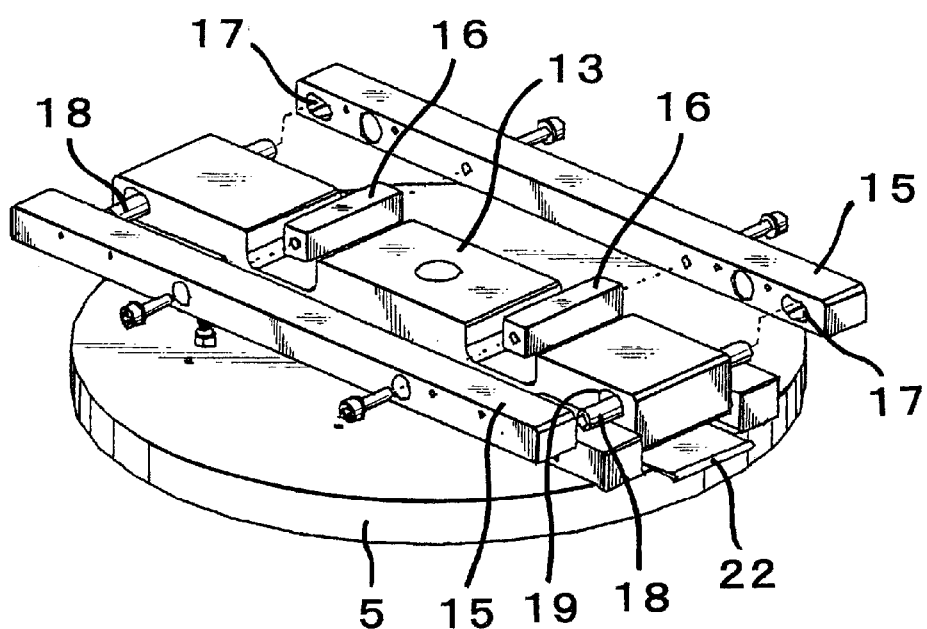
FIG. 5 is a perspective view of a power transmission device of the pendulum gate valve in accordance with the present invention.
Figure 14:
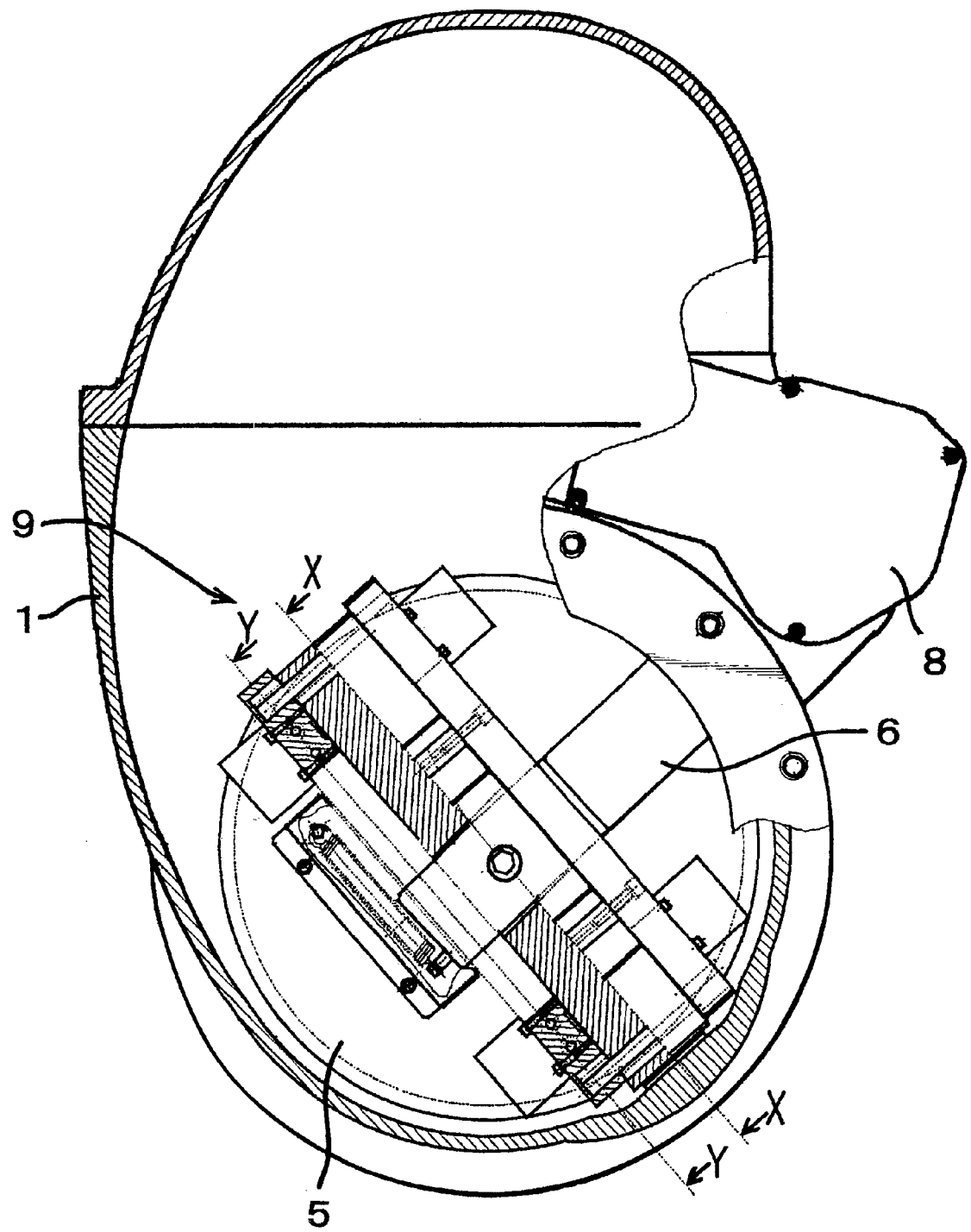
FIG. 14 is a vertical sectional front view of the pendulum gate valve in accordance with the present invention in a state just the gate valve is closed.

As shown in FIG. 1 to FIG. 3, a pendulum gate valve in accordance with the present invention comprises a hollow box-like valve housing 1 in the shape of oval in cross section, defining an interior space, a pair of opposing circular openings 2 and 3, a valve seat 4 provided in the interior space of the valve housing 1 around the edge of opening 2, a valve disk 5, which comes into contact with the valve seat 4 when the valve disk 5 is in the closed position, a pivot arm 6 connected at the tip end thereof to the valve disk 5 and connected pivotally at the base end thereof to a pivotal shaft 7 formed on the valve housing 1, an arm driving device 8 for moving the valve disk 5 between a completely opened position (as illustrated in FIG. 1) and a completely closed position (as illustrated in FIG. 14), and a power transmission device 9 for urging the valve disk 5 toward the valve seat 4.

As shown in FIG. 1 to FIG. 9, the power transmission device 9 comprises two pairs of holders 10 facing each other with a space therebetween, mounted on a back surface 5a of the valve disk 5 opposite to the valve seat 4, two pairs of first roller guide grooves 11 formed on opposite surfaces of said holders 10, two first rollers 12, both ends of each first roller 12 being inserted into said each pair of first roller guide grooves 11, a valve support 13 inserted between each pair of holders 10 and secured to said pivot arm 6, and two second roller guide grooves 14 formed passing through valve disk support 13 for receiving therein said first rollers 12, respectively.

Figure 6:
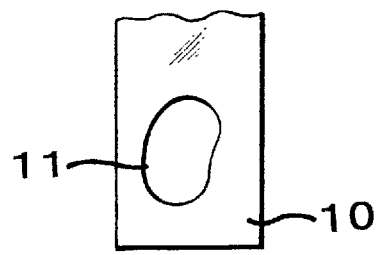
FIG. 6 is a side view of a first roller guide groove of the pendulum gate valve in accordance with the present invention.
Figure 7:
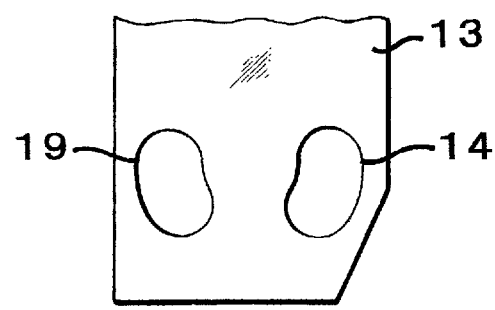
FIG. 7 is a side view of second and fourth roller guide grooves of the pendulum gate valve in accordance with the present invention.
Figure 8:
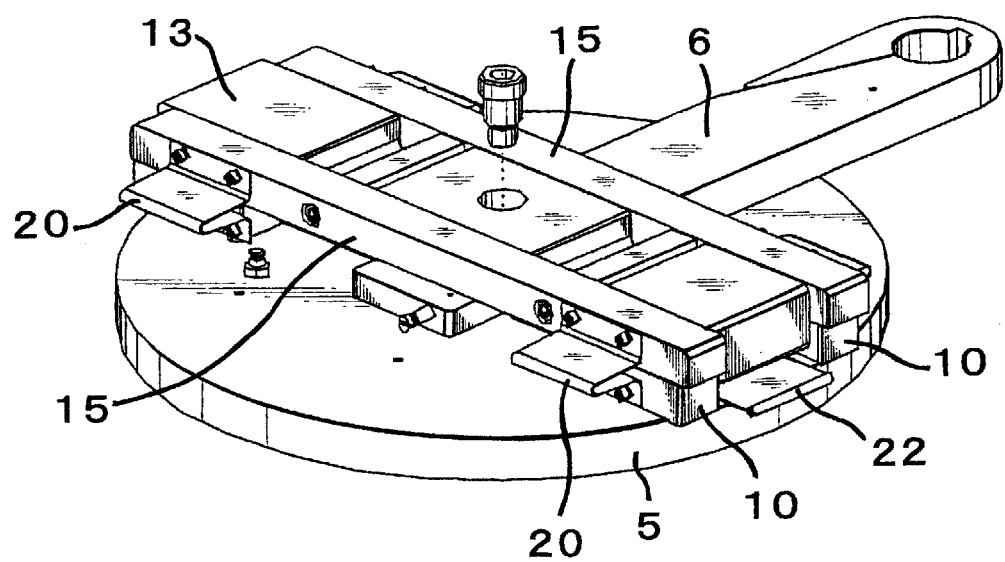
FIG. 8 is a perspective view of a power transmission device of the pendulum gate valve in accordance with the present invention.

The first roller guide groove 11 formed on the holder 10 is extended downwards obliquely so as to be separated from the valve disk 5 and then extended downwards substantially vertically, as shown in FIG. 3 and FIG. 6. Said first roller guide groove 11 is in the form of an elongated hole having a width similar substantially to the diameter of the first roller 12. The second roller guide groove 14 formed on the valve disk support 13 is extended upwards obliquely so as to approach to the valve disk 5 and then extended upwards substantially vertically at a position corresponding to the position of said first roller guide groove 11, as shown in FIG. 2 and FIG. 7. Said second roller guide groove 14 is in the form of an elongated hole having a width similar substantially to the diameter of the first roller 12.

Figure 15:
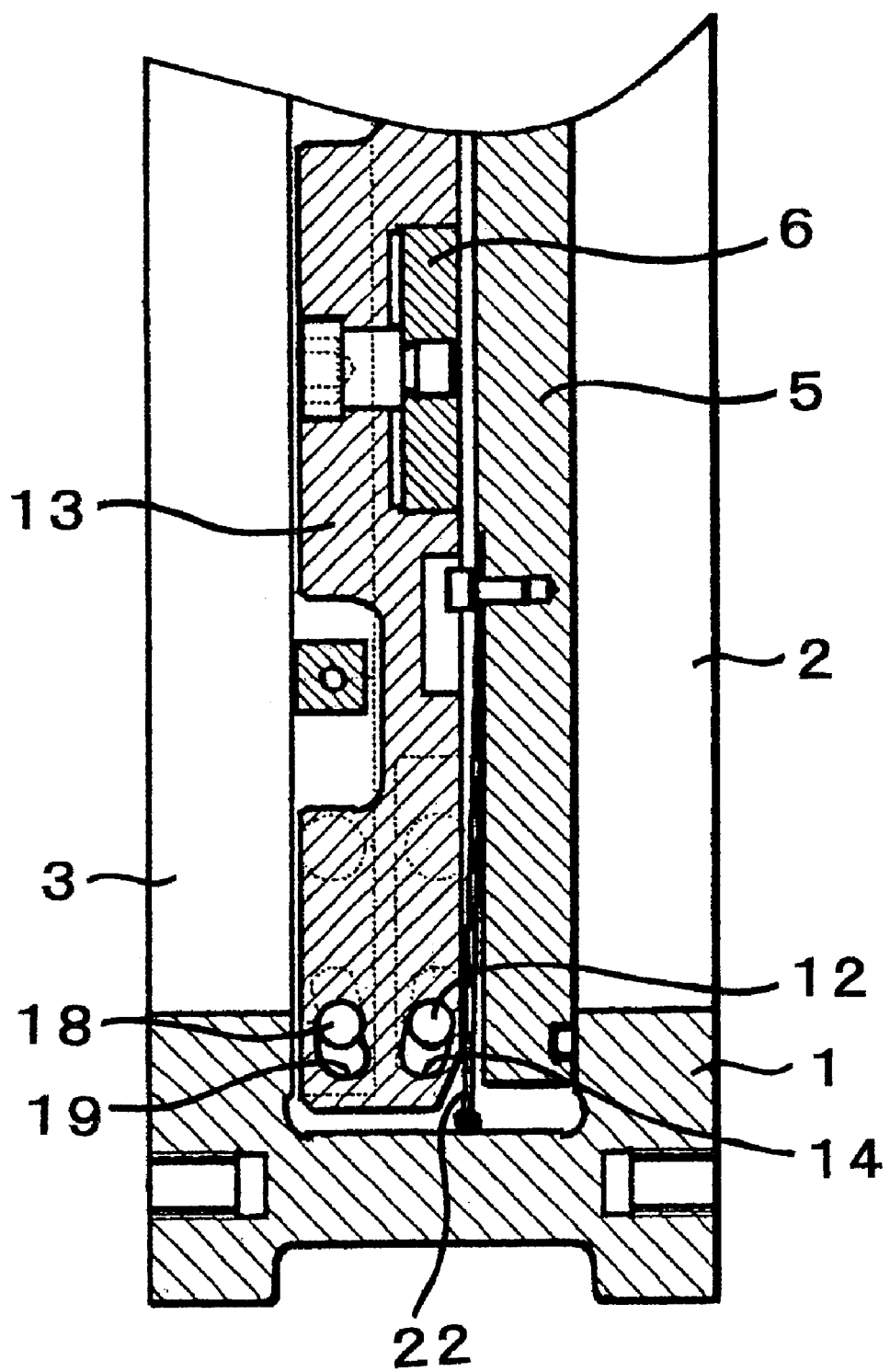
FIG. 15 is a cross sectional view taken along line X—X of FIG. 14.

Said valve disk 5 is separated from and approaches to the valve seat 4 relative to the valve disk support 13, when said valve disk support 13 is moved up and down along said holder 10 as shown in FIG. 2 and FIG. 15.

Further, in the present invention as shown in FIG. 3, FIG. 5, FIG. 8 and FIG. 9, the power transmission device 9 comprises a pair of supporting plates 15 arranged at both sides of said valve disk support 13, two connecting bars 16 inserted between said pair of supporting plates 13 to connect them together, two pairs of third roller guide grooves 17 formed on opposite surfaces of said supporting plates 15, two second rollers 18, both ends of each second roller 18 being inserted into said each pair of third roller guide grooves 17, two fourth roller guide grooves 19 formed passing through said valve disk support 13 for receiving therein said second rollers 18, respectively, two pairs of plate springs 20 for connecting each of said holders 10 and each of said supporting plate 15 corresponding thereto together, a tension spring 21, one end of which is fixed to the tip end of said pivot arm 6 and the other end of which is fixed to said valve disk 5 so as to urge always said pivot arm 6 in one direction relative to said valve disk 5, and a stopper 22 formed of a plate spring etc. projected downwards from the lower end of said valve disk 5.

Figure 9:
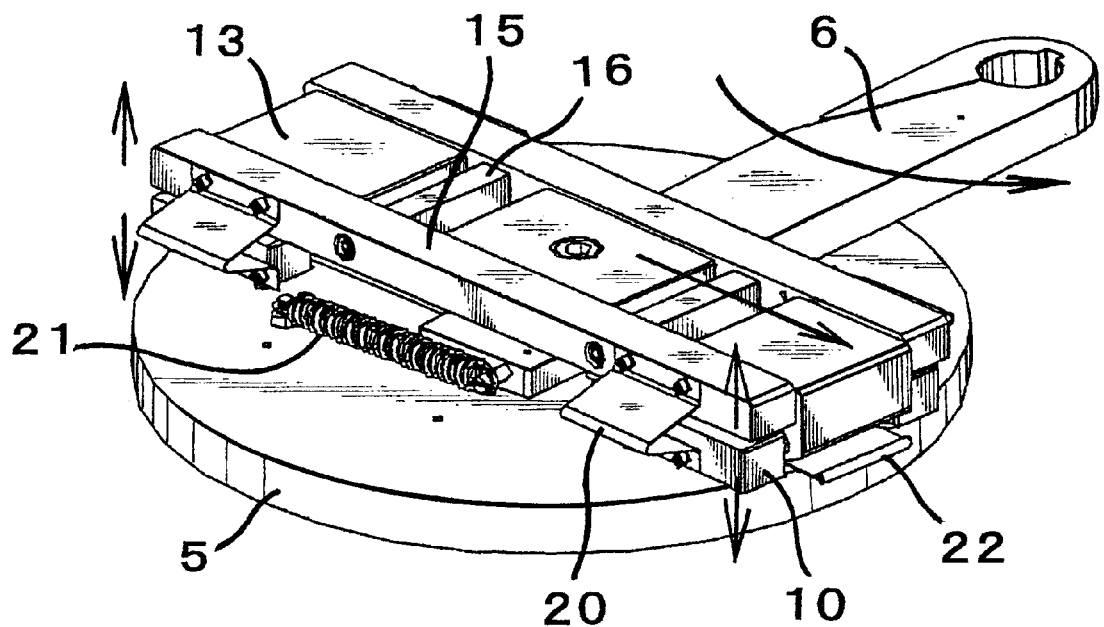
FIG. 9 is a perspective view of a power transmission device of the pendulum gate valve in accordance with the present invention.

Said plate spring 20 serves such that the holder 10 and the supporting plate 15 are prevented from moving relative to each other in the moving direction of the pivot arm 6, but allows the relative movement of them in a direction normal to the moving direction of the pivot arm 6 shown by an arrow in FIG. 9.

Figure 10:
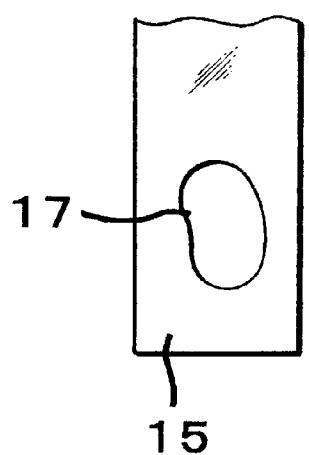
FIG. 10 is a side view of a third roller guide groove of the pendulum gate valve in accordance with the present invention.

The third roller guide groove 17 formed on the supporting plate 15 is extended downwards obliquely so as to approach to the valve disk 5 and then extended downwards substantially vertically, as shown in FIG. 3 and FIG. 10. Said third roller guide groove 17 is in the form of an elongated hole having a width similar substantially to the diameter of the second roller 18. The fourth roller guide groove 19 formed on the valve disk support 13 is extended upwards obliquely so as to be separated from the valve disk 5 and then extended upwards substantially vertically at a position corresponding to the position of said third roller guide groove 17, as shown in FIG. 2 and FIG. 7. Said fourth roller guide groove 19 is in the form of an elongated hole having a width similar substantially to the diameter of the second roller 18.

Figure 13:
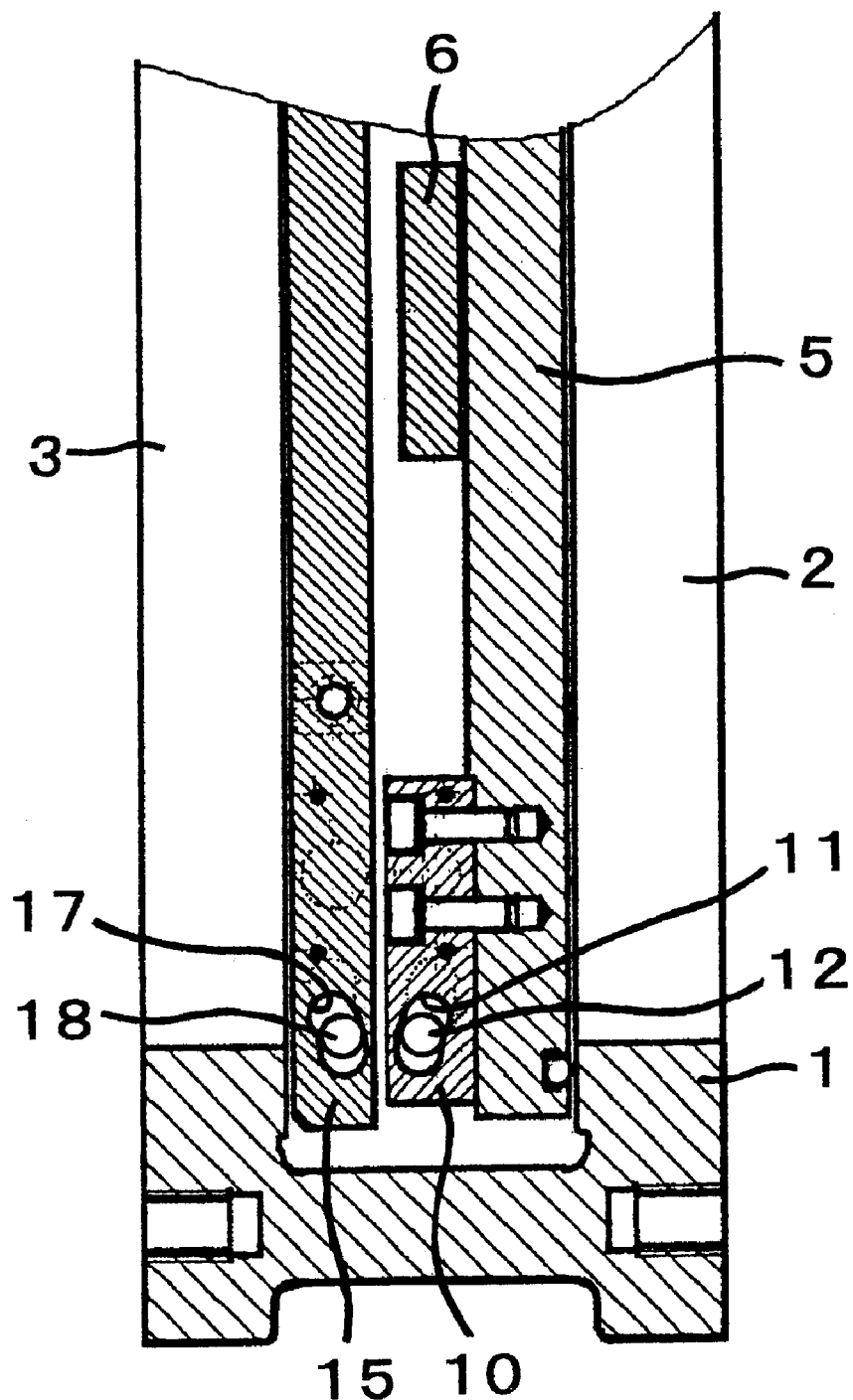
FIG. 13 is a cross sectional view taken along line Y—Y of FIG. 11.
Figure 16:
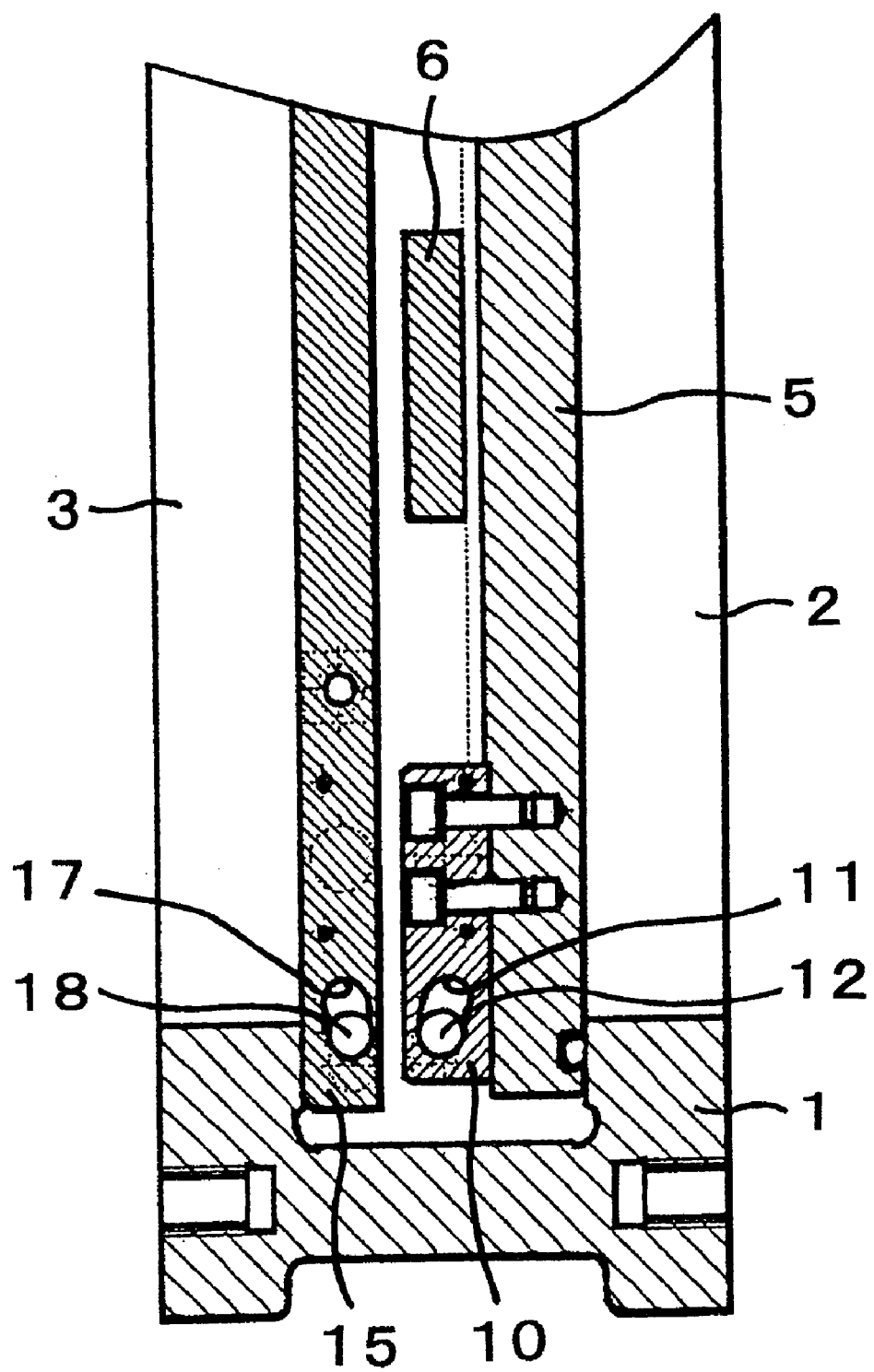
FIG. 16 is a cross sectional view taken along line Y—Y of FIG. 14.
Figure 17:
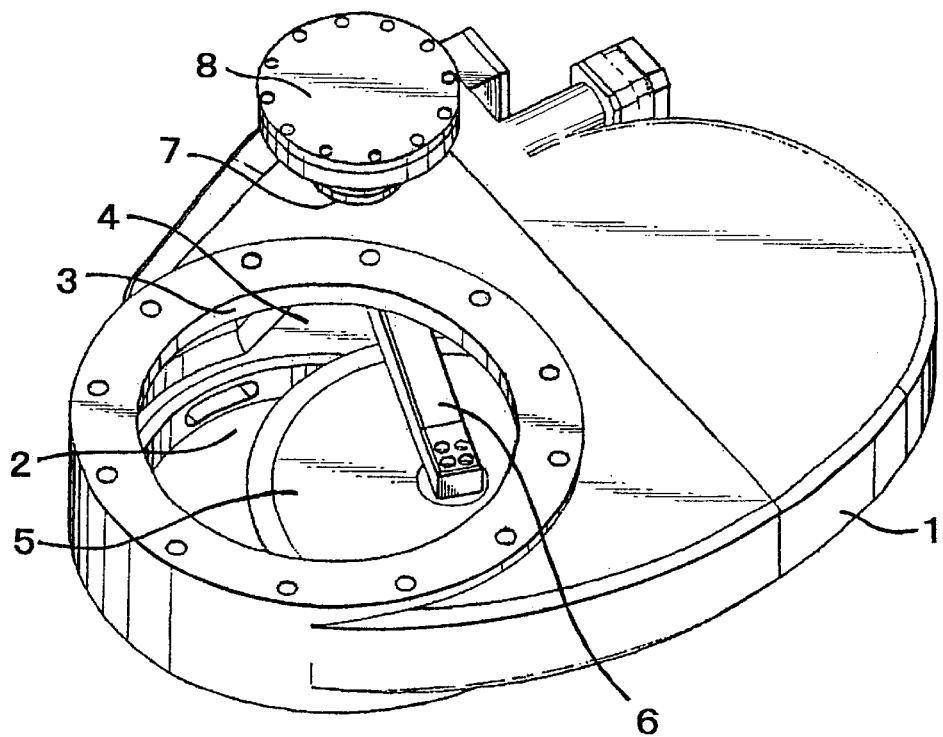
FIG. 17 is a perspective view of a power transmission device of the conventional pendulum gate valve.
Figure 18:
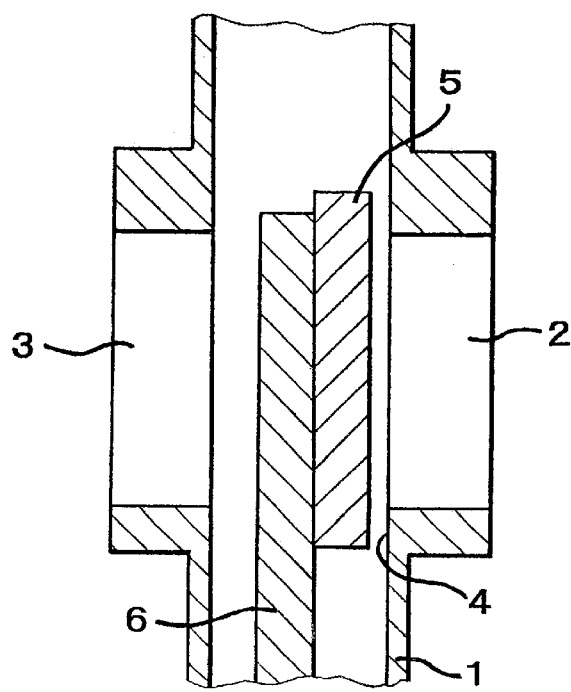
FIG. 18 is a vertical sectional side view of a part of the conventional gate valve.

Said supporting plate 15 is separated from and approach to the opening 3 of the valve housing 1 relative to the valve disk 5, as shown in FIG. 13 and FIG. 16 when said valve disk support 13 is moved up and down along said holder 10 and the supporting plate 15 as shown in FIG. 2 and FIG. 15.

Figure 11:
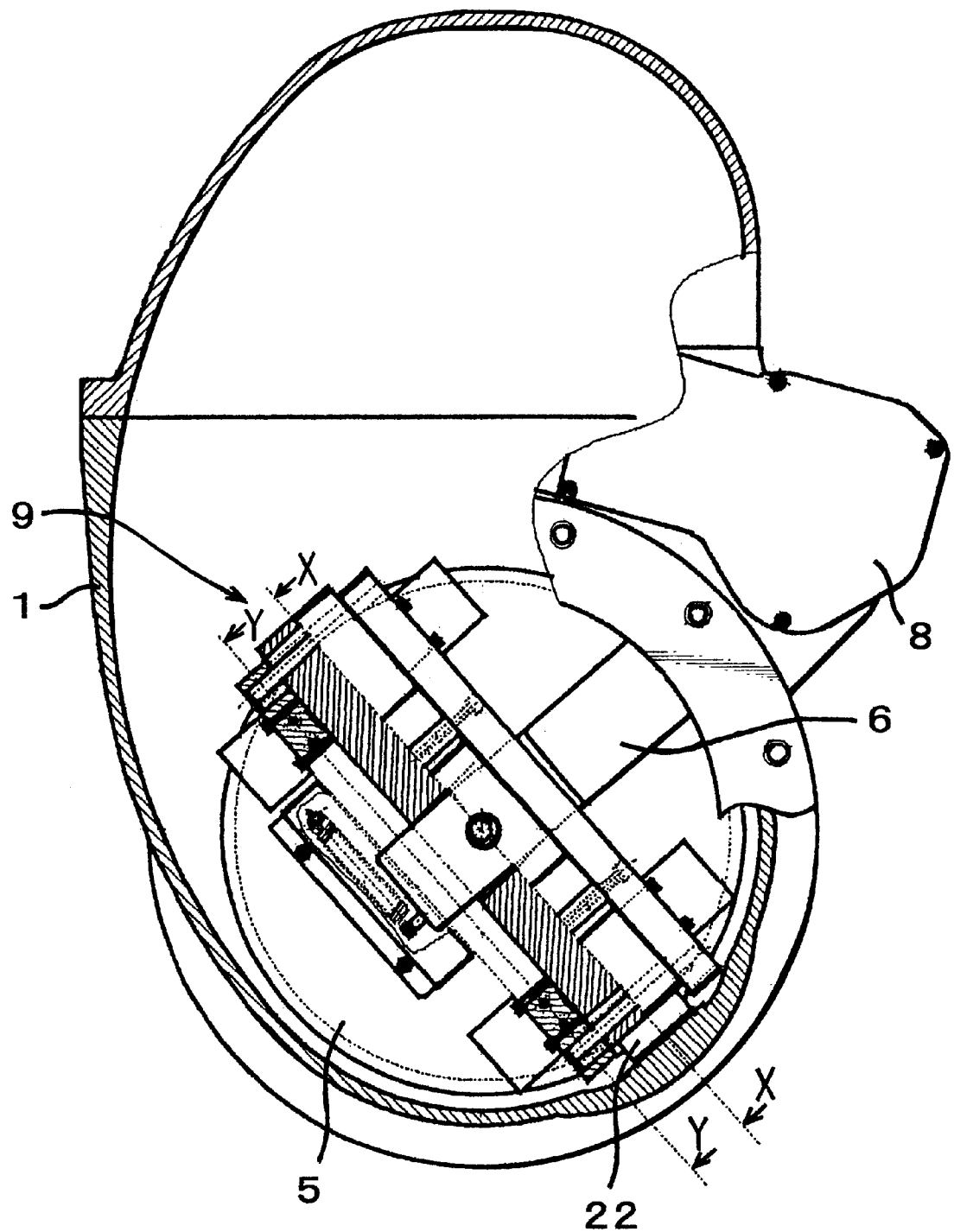
FIG. 11 is a vertical sectional front view of the pendulum gate valve in accordance with the present invention in a state just before the gate valve is closed.
Figure 12:
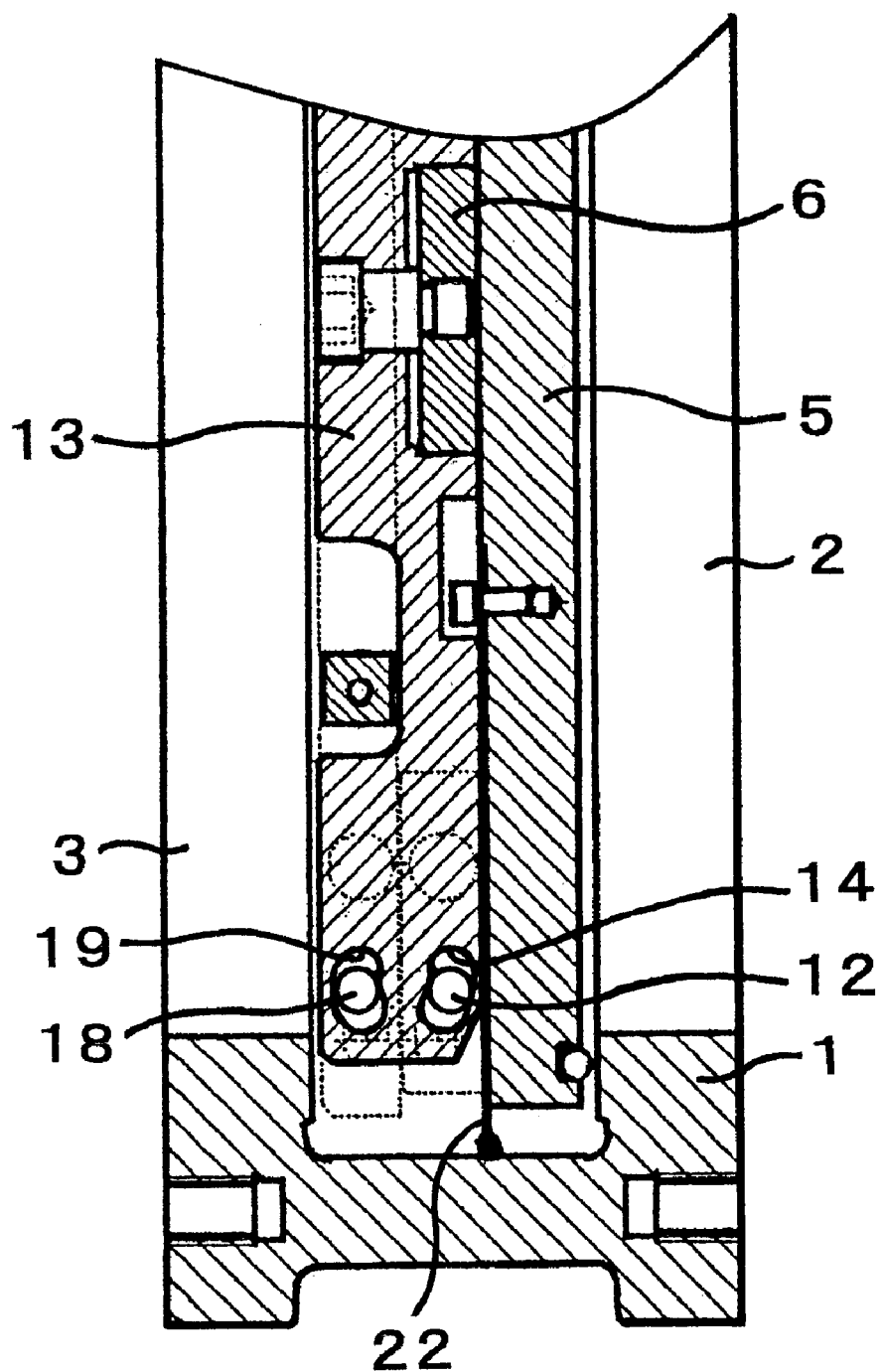
FIG. 12 is a cross sectional view taken along line X—X of FIG. 11.

The pendulum gate valve according to the present invention is constructed as mention above, and accordingly, when the arm driving device 8 is operated so as to swing the arm 6 in the direction shown by the arrow in FIG. 9 from a position shown in FIG. 1 where the openings 2 and 3 are opened to a position shown in FIG. 11 where the valve disk 5 faces to the opening 2, the stopper 22 projected from the lower end of the valve disk 5 is brought into contact with the inside surface of the valve housing 1, as shown in FIG. 11, and the movement of the valve disk 5 is stopped. When the arm 6 is moved further in the direction shown by the arrow in FIG. 9, the valve disk support 13 fixed to the arm 6 is also moved against the force of the tension spring 21 relative to the valve disk 5, as shown in FIG. 14 to FIG. 16, so that the first roller 12 is moved while rotating along the first roller guide groove 11 and reaches finally to the lower vertical portion of the first roller guide groove 11, as shown in FIG. 16 and that the first roller 12 is moved while rotating along the second roller guide groove 14 and reaches finally to the upper vertical portion of the second roller guide groove 14, as shown in FIG. 15.

At the same time, the second roller 18 passing through the fourth roller guide groove 19 of the valve disk support 13 is moved while rotating along the third roller guide grooves 17 of the supporting plate 15 and reaches finally to the lower vertical portion of the third roller guide groove 17, shown in FIG. 16, and at the same time the second roller 18 is moved while rotating along the fourth roller guide groove 19 and reaches finally to the upper vertical portion of the fourth roller guide groove 19 of the valve disk support 13, as shown in FIG. 15.

As a result, the supporting plate 15 is pressed to the valve housing 1 around the edge of the opening 3 with a large force and reaction force thereof is applied to the valve disk 5, so that the valve disk 5 is urged strongly to the valve seat 4.

In this state, even if the arm driving device 8 is deenergized to stop the movement of the arm 6 the valve disk 5 is maintained at the pressure contact state to the valve seat 4.

In case that the gate valve is to be opened, the arm driving device 8 is actuated to move through the arm 6 the valve disk 5 from the closed position to the open position, so that the valve disk support 13 is moved at first relative to the holder 10 and the supporting plate 15 by the spring force of the tension spring 21, and that the first and second rollers 12 and 18 are moved together with the valve disk support 13 while rotating along the first and third roller guide grooves 11 and 17, respectively. As a result, the valve disk 5 is separated from the valve seat 4 as well as the supporting plate 15 is separated from the opening 3. A further movement of the arm 6 results in the movement of the valve disk 5, so that the openings 2 and 3 are opened perfectly.

In an another embodiment of the present invention, the holder 10 and the valve disk 5 are formed as a unit.

In the other embodiment of the present invention, each of the first and second roller guide grooves 11 and 14 is extended downwards obliquely so as to be separated form the valve disk 5, and each of the third and fourth roller guide grooves 17 and 19 is extended downwards obliquely so as to approach to the valve disk 5.

EFFECT OF THE INVENTION

The present invention provides important advantages over the conventional gate valve. For example, the pendulum gate valve of the present invention uses the power transmission device 9 having two rollers 12 and 18 and four roller guide grooves 11, 14, 17 and 19, so that the valve disk 5 can be urged toward the valve seat 4 with a very strong force. Further, the roller 12 and 18 are moved in the roller guide grooves 11, 14, 17 and 19 while rotating without using any lubricant, so that foreign matters which would probably be produced due to the frictional movements of the rollers can be prevented from being produced on the contrary to the conventional gate valve. The valve disk 5 is urged to the valve seat 4 by the reaction force of the supporting plate 15, so that the arm driving device 8 and the arm 6 can be made simple in construction and small in size.

Furthermore, the gate valve can be closed by the continuous swing motion of the pivot arm 6 to move the valve disk 5 toward the opening and to urge the valve disk 5 toward the valve seat 4, so that the continuous control of the flow of the fluid can be carried out, if the gate valve is used as a fluid flow control valve.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A pendulum gate valve comprising:
a valve housing including an interior space and first and second openings opposite to each other;
a valve seat disposed in the interior space around the edge of the first opening;
a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;
a pivot arm, the base end of which is pivotally secured to the valve housing;
an arm driving device for moving a tip end of the pivot arm between a first position where the valve disk is in the completely opened position and a second position where the valve disk is in the completely closed position; and
a power transmission device for transmitting the movement of the pivot arm to the valve disk;
the power transmission device having a first roller guide groove formed on the valve disk, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, each of the first and second roller guide grooves extending downwards obliquely so as to be separated from the valve disk, and each of the third and fourth roller guide grooves extending downwards obliquely so as to approach to the valve disk.

2. The pendulum gate valve according to claim 1, further comprising a member for preventing resiliently the supporting plate from moving relative to the valve disk in the moving direction of the pivot arm.

3. The pendulum gate valve according to claim 2, further comprising a stopper projected downwards from the lower end of the valve disk.

4. The pendulum gate valve according to claim 1, further comprising a member for preventing resiliently the valve disk from moving relative to the valve disk support in the moving direction of the pivot arm.

5. The pendulum gate valve according to claim 4, further comprising a member for preventing resiliently the valve disk from moving relative to the valve disk support in the moving direction of the pivot arm.

6. The pendulum gate valve according to claim 4, further comprising a stopper projected downwards from the lower end of the valve disk.

7. The pendulum gate valve according to claim 1, further comprising a stopper projected downwards from the lower end of the valve disk.

8. A pendulum gate valve comprising:
   a valve housing including an interior space and first and second openings opposite to each other;
   a valve seat disposed in the interior space around the edge of the first opening;
   a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;
   a pivot arm, the base end of which is pivotally secured to the valve housing;
   an arm driving device for moving a tip end of the pivot arm between a first position where the valve disk is in the completely opened position and a second position where the valve disk is in the completely closed position; and
   a power transmission device for transmitting the movement of the pivot arm to the valve disk;
   the power transmission device having a first roller guide groove formed on the valve disk, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, the first roller guide groove extending downwards obliquely so as to be separated from the valve disk and then extending downwards substantially vertically, the second roller guide groove extending upwards obliquely so as to approach to the valve disk and then extending upwards substantially vertically, the third roller guide groove extending downwards obliquely so as to approach to the valve disk and then extended downwards substantially vertically, and the fourth roller guide groove extending upwards obliquely so as to be separated from the valve disk and then extended upwards substantially vertically.

9. The pendulum gate valve according to claim 8, further comprising a member for preventing resiliently the supporting plate from moving relative to the valve disk in the moving direction of the pivot arm.

10. The pendulum gate valve according to claim 8, further comprising a member for preventing resiliently the valve disk from moving relative to the valve disk support in the moving direction of the pivot arm.

11. The pendulum gate valve according to claim 8, further comprising a stopper projected downwards from the lower end of the valve disk.

12. A pendulum gate valve comprising:
   a valve housing including an interior space and first and second openings opposite to each other;
   a valve seat disposed in the interior space around the edge of the first opening;
   a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;
   a pivot arm, the base end of which is pivotally secured to the valve housing;
   an arm driving device for moving a tip end of the pivot arm between a first position where the valve disk is in the completely opened position and a second position where the valve disk is in the completely closed position; and
   a power transmission device for transmitting the movement of the pivot arm to the valve disk;
   the power transmission device having a pair of holders facing each other with a space therebetween, mounted on a back surface of the valve disk opposite to the valve seat, a first roller guide groove formed on each of opposite surfaces of the holders, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, each of the first and second roller guide grooves extending downwards obliquely so as to be separated from the valve disk, and each of the third and fourth roller guide grooves extending downwards obliquely so as to approach to the valve disk.

13. The pendulum gate valve according to claim 12, further comprising a member for preventing resiliently the supporting plate from moving relative to the valve disk in the moving direction of the pivot arm.

14. The pendulum gate valve according to claim 12, further comprising a member for preventing resiliently the valve disk from moving relative to the valve disk support in the moving direction of the pivot arm.

15. The pendulum gate valve according to claim 12, further comprising a stopper projected downwards from the lower end of the valve disk.

16. A pendulum gate valve comprising:
   a valve housing including an interior space and first and second openings opposite to each other;
   a valve seat disposed in the interior space around the edge of the first opening;
   a valve disk mounted relative to the valve housing so that the valve disk is movable within the interior space between a completely opened position and a completely closed position, the valve disk being constructed so that when the valve disk is moved to the closed position the valve disk engages the valve seat and seals the first opening;
   a pivot arm, the base end of which is pivotally secured to the valve housing;

an arm driving device for moving a tip end of the pivot arm between a first position where the valve disk is in the completely opened position and a second position where the valve disk is in the completely closed position; and a power transmission device for transmitting the movement of the pivot arm to the valve disk;

the power transmission device having a pair of holders facing each other with a space therebetween, mounted on a back surface of the valve disk opposite to the valve seat, a first roller guide groove formed on each of opposite surfaces of the holders, a valve disk support fixed to the tip end of the pivot arm, movable relative to the valve disk, a second roller guide groove formed on the valve disk support so as to face to the first roller guide groove, a third roller guide groove formed on the valve disk support, a supporting plate, a fourth roller guide groove formed on the supporting plate so as to face to the third roller guide groove, a first roller engaging with the first and second roller guide grooves, and a second roller engaging with the third and fourth roller guide grooves, the first roller guide groove extending downwards obliquely so as to be separated from the valve disk and then extending downwards substantially vertically, the second roller guide groove extending upwards obliquely so as to approach to the valve disk and then extending upwards substantially vertically, the third roller guide groove extending downwards obliquely so as to approach to the valve disk and then extended downwards substantially vertically, and the fourth roller guide groove extending upwards obliquely so as to be separated from the valve disk and then extended upwards substantially vertically.

17. The pendulum gate valve according to claim 16, further comprising a member for preventing resiliently the supporting plate from moving relative to the valve disk in the moving direction of the pivot arm.

18. The pendulum gate valve according to claim 16, further comprising a member for preventing resiliently the valve disk from moving relative to the valve disk support in the moving direction of the pivot arm.

19. The pendulum gate valve according to claim 16, further comprising a stopper projected downwards from the lower end of the valve disk.

* * * * *